(12) United States Patent
Kumar et al.

(10) Patent No.: US 11,082,224 B2
(45) Date of Patent: *Aug. 3, 2021

(54) LOCATION AWARE CRYPTOGRAPHY

(71) Applicant: Cryptography Research, Inc., Sunnyvale, CA (US)

(72) Inventors: Ambuj Kumar, Sunnyvale, CA (US); Mark Evan Marson, Carlsbad, CA (US); Daniel Robert Beitel, San Francisco, CA (US)

(73) Assignee: Cryptography Research, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/445,708

(22) Filed: Jun. 19, 2019

(65) Prior Publication Data
US 2020/0007328 A1    Jan. 2, 2020

Related U.S. Application Data

(63) Continuation of application No. 15/900,722, filed on Feb. 20, 2018, now Pat. No. 10,341,106, which is a
(Continued)

(51) Int. Cl.
*H04L 9/30* (2006.01)
*H04L 9/32* (2006.01)
(Continued)

(52) U.S. Cl.
CPC .......... *H04L 9/3066* (2013.01); *G06F 21/606* (2013.01); *H04L 9/0872* (2013.01);
(Continued)

(58) Field of Classification Search
CPC ... H04L 9/3066; H04L 9/0872; H04L 9/3263; H04L 63/0442; H04L 63/107;
(Continued)

(56) References Cited

U.S. PATENT DOCUMENTS 5,361,062 A   11/1994   Weiss et al.
5,337,270 A   12/1994   Koopman, Jr. et al.
(Continued)

OTHER PUBLICATIONS

Karimi, Rohollah et al., "Enhancing Security and Confidentiality on Mobile Devices by Location-based Data Encryption", 2011 17th IEEE International Conference on Networks (ICON), pp. 241-245, Dec. 14-16, 2011. 5 pages.
(Continued)

*Primary Examiner* — Aravind K Moorthy
(74) *Attorney, Agent, or Firm* — Lowenstein Sandler LLP

(57) ABSTRACT

A first entity may provide a request to transmit data from the first entity to a second entity. The first entity may receive a session key from the second entity in response to the request where the session key is encrypted by a second key that is based on a combination of a public key and a location associated with the second entity. A location associated with the first entity may be identified. Furthermore, a first key may be generated based on a combination of the location associated with the first entity and a private key that corresponds to the public key. The first key may decrypt data encrypted by the second key when the location associated with the first entity corresponds to the location associated with the second entity.

20 Claims, 13 Drawing Sheets

Related U.S. Application Data continuation of application No. 14/949,254, filed on Nov. 23, 2015, now Pat. No. 9,923,719.

(60) Provisional application No. 62/089,700, filed on Dec. 9, 2014.

(51) Int. Cl.

| | |
|---|---|
| *H04W 12/02* | (2009.01) |
| *G06F 21/60* | (2013.01) |
| *H04L 9/08* | (2006.01) |
| *H04L 29/06* | (2006.01) |
| *H04W 12/63* | (2021.01) |
| *H04W 4/40* | (2018.01) |
| *H04W 4/46* | (2018.01) |

(52) U.S. Cl.
CPC ........... *H04L 9/3263* (2013.01); *H04W 12/02* (2013.01); *G06F 2221/2107* (2013.01); *G06F 2221/2111* (2013.01); *H04L 63/0442* (2013.01); *H04L 63/107* (2013.01); *H04W 4/40* (2018.02); *H04W 4/46* (2018.02); *H04W 12/63* (2021.01)

(58) Field of Classification Search
CPC ........... G06F 21/606; G06F 2221/2107; G06F 2221/2111; H04W 12/02; H04W 12/00503; H04W 4/46; H04W 4/40
See application file for complete search history.

(56) References Cited

U.S. PATENT DOCUMENTS

| | | | | |
|---|---|---|---|---|
| 6,085,320 A * | 7/2000 | Kaliski, Jr. | ............. | G06F 21/33 713/168 |
| 6,229,894 B1 * | 5/2001 | Van Oorschot | ..... | G06F 21/6209 709/229 |
| 6,252,964 B1 * | 6/2001 | Wasilewski | ......... | H04L 63/0823 380/282 |
| 6,278,783 B1 | 8/2001 | Kocher et al. | | |
| 6,295,606 B1 | 9/2001 | Messerges et al. | | |
| 6,381,696 B1 * | 4/2002 | Doyle | .................... | G06F 21/64 713/156 |
| 6,560,340 B1 * | 5/2003 | Akins, III | .......... | H04N 21/4524 380/239 |
| 6,948,062 B1 | 9/2005 | Clapper | | |
| 7,110,539 B1 | 9/2006 | Bao et al. | | |
| 7,120,254 B2 | 10/2006 | Glick et al. | | |
| 7,124,190 B1 * | 10/2006 | Moore | ..................... | H04L 63/12 709/229 |
| 7,302,565 B2 | 11/2007 | Meandzija et al. | | |
| 7,334,133 B2 | 2/2008 | Goubin | | |
| 7,693,277 B2 | 4/2010 | Beeson | | |
| 7,848,515 B2 | 12/2010 | Dupaquis et al. | | |
| 7,869,591 B1 * | 1/2011 | Nagel | .................. | H04L 9/3249 380/28 |
| 7,966,491 B2 * | 6/2011 | Nassor | .................... | H04L 63/08 380/255 |
| 8,050,402 B2 | 11/2011 | Golic | | |
| 8,315,389 B2 | 11/2012 | Qiu et al. | | |
| 8,397,988 B1 * | 3/2013 | Zuili | ..................... | G07F 7/1008 235/383 |
| 8,472,627 B2 | 6/2013 | Denning et al. | | |
| 8,625,802 B2 | 1/2014 | Parann-Nissany | | |
| 8,781,502 B1 * | 7/2014 | Middleton | ............ | H04L 9/0819 455/456.3 |
| 8,824,677 B1 | 9/2014 | Ramzan et al. | | |
| 9,231,926 B2 | 1/2016 | Adkins et al. | | |
| 9,444,694 B1 | 9/2016 | Sweeting | | |
| 9,923,719 B2 * | 3/2018 | Kumar | .................. | H04L 9/0872 |
| 10,341,106 B2 * | 7/2019 | Kumar | .................. | H04W 12/02 |
| 2001/0039630 A1 | 11/2001 | Kursawe et al. | | |
| 2001/0053226 A1 * | 12/2001 | Akins, III | ........... | H04L 63/0823 380/282 |
| 2002/0128969 A1 * | 9/2002 | Parmelee | ............. | G06Q 20/382 705/42 |
| 2003/0081791 A1 * | 5/2003 | Erickson | ............... | G06F 21/6209 380/282 |
| 2003/0159029 A1 * | 8/2003 | Brown | .................. | H04L 69/329 713/151 |
| 2003/0167409 A1 * | 9/2003 | Sussman | ................ | H04L 29/06 726/29 |
| 2003/0172278 A1 * | 9/2003 | Farnham | ............... | H04L 9/0844 713/176 |
| 2003/0191935 A1 * | 10/2003 | Ferguson | .............. | H04W 12/06 713/153 |
| 2003/0204738 A1 * | 10/2003 | Morgan | .............. | H04L 63/0853 713/194 |
| 2004/0044911 A1 * | 3/2004 | Takada | ................ | H04L 63/0428 713/170 |
| 2004/0123104 A1 * | 6/2004 | Boyen | .................... | G06F 21/602 713/165 |
| 2004/0205330 A1 * | 10/2004 | Godfrey | ................ | H04L 63/126 713/150 |
| 2005/0169462 A1 | 8/2005 | Jung et al. | | |
| 2005/0219149 A1 | 10/2005 | Tuyls et al. | | |
| 2006/0021063 A1 * | 1/2006 | Hori | ...................... | H04L 9/3066 726/27 |
| 2006/0085354 A1 * | 4/2006 | Hirai | ....................... | G06F 21/10 705/59 |
| 2006/0242411 A1 * | 10/2006 | Lin | ..................... | H04L 63/0823 713/171 |
| 2006/0294362 A1 * | 12/2006 | Epstein | .................. | H04L 63/061 713/153 |
| 2007/0079132 A1 * | 4/2007 | Tanaka | ................... | H04L 9/3297 713/178 |
| 2007/0198436 A1 * | 8/2007 | Weiss | .................. | H04L 63/0861 705/75 |
| 2009/0044010 A1 * | 2/2009 | Hughes | .................. | H04L 63/123 713/165 |
| 2009/0319771 A1 | 12/2009 | Nagaraja | | |
| 2009/0319779 A1 * | 12/2009 | Thoursie | .................. | H04L 63/0823 713/156 |
| 2010/0020964 A1 * | 1/2010 | Horie | ...................... | G06F 7/725 380/44 |
| 2010/0098249 A1 * | 4/2010 | Shin | ...................... | H04L 9/0872 380/44 |
| 2010/0191975 A1 * | 7/2010 | Chase | .................. | H04L 63/0823 713/176 |
| 2010/0223461 A1 * | 9/2010 | Drader | .................. | H04L 9/0863 713/159 |
| 2010/0278335 A1 | 11/2010 | Enge et al. | | |
| 2011/0093712 A1 * | 4/2011 | Jin | ........................ | H04L 9/0869 713/171 |
| 2011/0286594 A1 | 11/2011 | Resch et al. | | |
| 2011/0296172 A1 * | 12/2011 | Fu | ........................ | H04L 9/0825 713/156 |
| 2012/0066500 A1 * | 3/2012 | Ananthasubramanian | .................. | H04L 63/061 713/171 |
| 2012/0303963 A1 * | 11/2012 | Murao | .................. | H04L 9/3263 713/178 |
| 2013/0007471 A1 * | 1/2013 | Grab | ........................ | G06F 21/10 713/193 |
| 2013/0070925 A1 * | 3/2013 | Yamada | .................... | H04L 9/08 380/255 |
| 2013/0251150 A1 | 5/2013 | Chassagne | | |
| 2013/0160145 A1 * | 6/2013 | Henzie | ............... | H04N 21/4405 726/29 |
| 2013/0166909 A1 * | 6/2013 | Agrawal | ............... | H04L 63/123 713/168 |
| 2013/0236019 A1 * | 9/2013 | Zaverucha | ........... | H04L 63/306 380/278 |
| 2013/0244614 A1 * | 9/2013 | Santamaria | ........ | H04W 12/0609 455/411 |
| 2013/0263239 A1 * | 10/2013 | Lim | .................. | H04W 12/0609 726/7 |

(56) References Cited

U.S. PATENT DOCUMENTS

| | | | |
|---|---|---|---|
| 2013/0266139 A1* | 10/2013 | Abl | G08G 1/054 380/255 |
| 2014/0012412 A1* | 1/2014 | Khonalkar | G06Q 20/382 700/237 |
| 2014/0093084 A1* | 4/2014 | De Atley | G06F 21/64 380/277 |
| 2014/0164761 A1 | 6/2014 | Kufluk et al. | |
| 2014/0301554 A1* | 10/2014 | Cheng | H04L 9/3242 380/284 |
| 2014/0325225 A1* | 10/2014 | Liu | H04L 9/3297 713/171 |
| 2014/0351912 A1 | 11/2014 | Fu et al. | |
| 2014/0380047 A1 | 12/2014 | Denning et al. | |
| 2015/0012747 A1* | 1/2015 | Choi | H04L 63/0435 713/168 |
| 2015/0095652 A1* | 4/2015 | Song | H04L 9/0861 713/176 |
| 2015/0110266 A1 | 4/2015 | Debraize | |
| 2015/0121071 A1* | 4/2015 | Schwarz | H04L 63/08 713/168 |
| 2015/0180840 A1* | 6/2015 | Jung | H04L 67/34 713/150 |
| 2015/0295714 A1* | 10/2015 | Liu | H04L 9/3226 713/183 |
| 2015/0372813 A1 | 12/2015 | Brand | |
| 2015/0379286 A1 | 12/2015 | Nordback | |
| 2016/0087792 A1 | 3/2016 | Smith et al. | |
| 2016/0352509 A1 | 12/2016 | Wu et al. | |

OTHER PUBLICATIONS

Yan, Gongjun et al., "A Geographic Location-Based Security Mechanism for Intelligent Vehicular Networks", Intelligen Computing and Information Science, Communications in Computer and Information Science vol. 135, 2011, pp. 693-698. 6 pages.

* cited by examiner

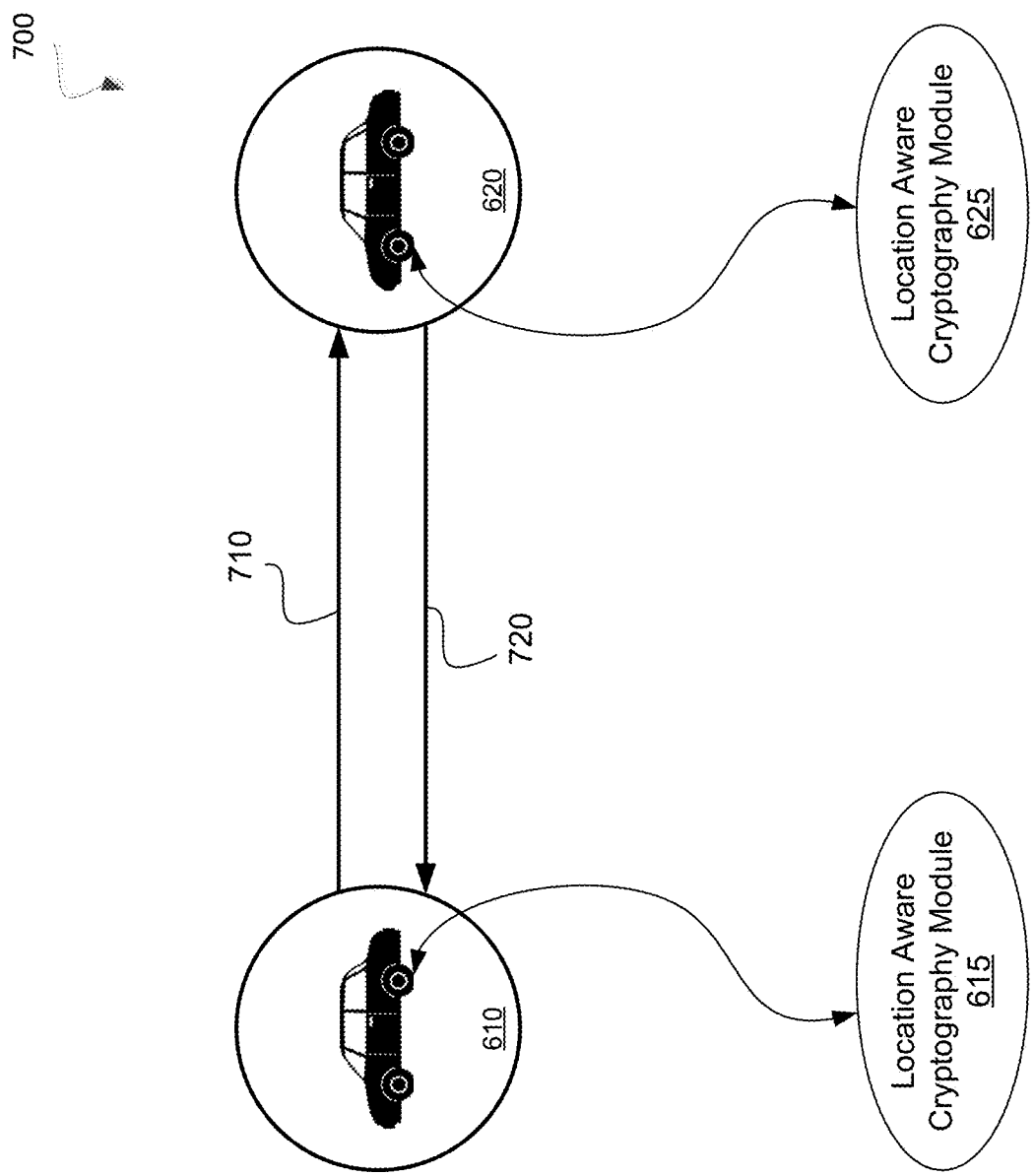

LOCATION AWARE CRYPTOGRAPHY

RELATED APPLICATION

This application is a continuation of U.S. patent application Ser. No. 15/900,722 filed on Feb. 20, 2018, which is a continuation of U.S. patent application Ser. No. 14/949,254, filed on Nov. 23, 2015, which claims the benefit under 35 U.S.C. § 119(e) of U.S. Provisional Application 62/089,700 filed on Dec. 9, 2014, each of which is hereby incorporated by reference.

BRIEF DESCRIPTION OF THE DRAWINGS

The present disclosure will be understood more fully from the detailed description given below and from the accompanying drawings of various implementations of the disclosure.

FIG. 7A illustrates an example environment including two entities using location aware cryptography with a key derivation technique in which some embodiments of the disclosure may operate.

DETAILED DESCRIPTION

Figure 1:
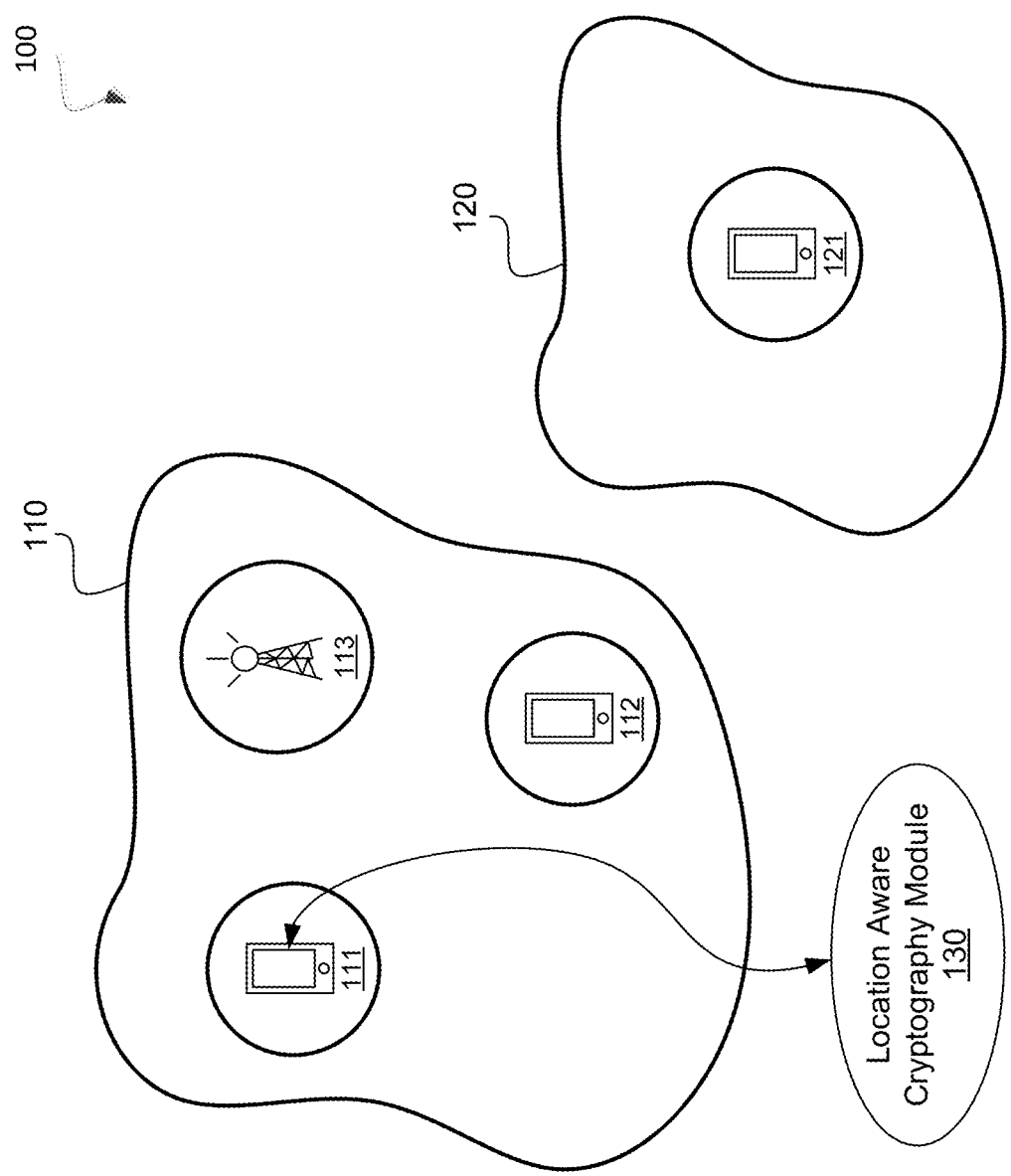
FIG. 1 illustrates an environment including multiple entities using location aware cryptography in accordance with some embodiments.

Aspects of the present disclosure are directed to location aware cryptography. An entity, such as a device (e.g., a cellular phone, cellular network base station, data card, card reader, etc.), vehicle, or any other object capable of communication, may interact (e.g., transmit data and receive data) with another entity based on location aware cryptography. In some embodiments, location aware cryptography may use a location of an entity to perform cryptographic operations that may be used to encrypt and decrypt data transmitted to another entity. For example, the location aware cryptography may be used to encrypt data and/or decrypt data transmitted between a first entity and a second entity by using a location determined by the first entity and a location determined by the second entity in the location aware cryptography.

The first entity may seek to transmit data to a second entity (e.g., a first vehicle transmitting speed and position data to a second vehicle). The data may be securely transmitted between the first entity and the second entity by using location aware cryptography to encrypt and decrypt the data. In response to initiating a data transmission, the first entity may generate location information associated with the first entity and the second entity may generate location information associated with the second entity. If the location information associated with the first entity is identical to the location information associated with the second entity (e.g., the first entity and the second entity are at the same location), then the first entity may be able to encrypt data to be transmitted to the second entity and the second entity may be able to decrypt the encrypted data received from the second entity (and vice versa). However, if the location information associated with the first entity is not the same as the location information associated with the second entity (e.g., the first entity and the second entity are at different locations), then when the first entity transmits the encrypted data to the second entity, the second entity will not be capable of decrypting the received encrypted data.

As an example, the first entity may initiate a transmission of data to the second entity. The first entity may generate location information based on the current location of the first entity and the second entity may separately generate location information based on the current location of the second entity. The first entity may then transmit a public key (e.g., a piece of information that determines the functional output of a cryptographic algorithm) to the second entity. After receiving the public key from the first entity, the second entity may generate a session key that may be used to facilitate the transmission of secure data between the first entity and the second entity. The second entity may further combine the public key received from the first entity with the location information associated with the second entity and may encrypt the session key with the combined public key and location information associated with the second entity. The encrypted session key may then be transmitted to or exchanged with the first entity which may decrypt the encrypted session key with a combination of a private key that corresponds to the public key and the location associated with the first entity. In some embodiments, the public key may be used to encrypt data and the private key may be used to decrypt the data encrypted by the public key. Thus, when the second entity transmits the encrypted session key (e.g., based on the combination of the location associated with the second entity and the public key), then the first entity may decrypt the encrypted session key by using a combination of the corresponding private key as well as the same location information that the second entity used in the encryption of the session key. Thus, if the first entity independently generated the same location information that the second entity generated, then the first entity may be able to decrypt the encrypted session key and use the session key for secure data transmission between the first entity and the second entity (e.g., by transmitting data encrypted by the session key and the second entity may use the session key to decrypt the data). However, if the first entity generated different location information than the second entity, then the first entity may not be able to decrypt the encrypted session key and, thus, not be able to use the session key for the secure data transmission.

In an alternative example, each of the first and second entities may generate or derive the session key (e.g., without the session key exchange as previously described). For example, each entity may transmit information (e.g., a random number, public key, or other such information) to the other entity. The first entity may then generate a key based on the location associated with the first entity, the information received from the second entity, and additional information while the second entity may also generate a key based on the location associated with the second entity, information received from the first entity, and additional information. If the location associated with the first entity is the same as the information associated with the second entity, each entity may separately generate or derive a key to be used to facilitate secure data transmission between the first entity and the second entity.

As such, location aware cryptography may be used to facilitate secure data transmission between entities by using separately generated or determined locations from each of the entities. The use of the location aware cryptography may result in the generation of keys when needed (e.g., on the fly in response to a data transmission between entities) without having to store many separate keys that are each tied to a particular location out of many locations. The storing of multiple keys may require a larger memory for each entity while the generation of the keys based on a determined location may not require the storage of multiple keys before the initiation of the data transmission. Aspects of the present disclosure address the above and other deficiencies.

FIG. 1 illustrates an environment 100 including multiple entities using location aware cryptography. In general, the environment 100 may include entities in locations 110 and 120 where an entity in the location 110 may generate the same location information as another entity in the same location 110 while an entity in the location 120 may generate location information that is different than the location information generated by the entities in location 110.

As shown in FIG. 1, the environment 100 may include a location 110 that includes entities 111, 112, and 113 and a location 120 that includes an entity 121. The entities 111, 112, 113, and 121 may be any type of device that may transmit data to another device. Examples of an entity include, but are not limited to, a cellular phone, cellular network base station, data card, card reader, and a vehicle. For example, the entities 111, 112, and 121 may be a mobile communications device (e.g., a cellular phone) and the entity 113 may be a network base station (e.g., a cellular network base station). Each of the entities may include a location aware cryptography module 130.

The entities 111, 112, 113, and 121 may transmit data between another one of the entities 111, 112, 113, 121. For example, the entity 111 may initiate a transmission to send data to the entity 112. In response to the initiation of the transmission of data between the entity 111 to the entity 112, the entity 111 may identify its location and the entity 112 may also identify its location. The location identified by the entity 111 and the location identified by the entity 112 may be used to secure data by using a key to encrypt the data as it is transmitted between the entity 111 and the entity 112. For example, the entity 111 may use its identified location to generate and/or decrypt a key and the entity 112 may also use its identified location to generate and/or decrypt a key. In the environment 100, the entities 111 and 112 are in the same location 110. As such, each of the entities 111 and 112 may identify the same location and may use the same identified location to generate or decrypt a key that is used to encrypt and decrypt data that is transmitted between the entities 111 and 112.

The entity 111 may also attempt to initiate a transmission to send data to the entity 121. In response to the initiation of the transmission, the entity 111 may identify that it is located in the location 110 while the entity 121 may identify that it is located in the location 120. Accordingly, the entity 111 may generate a first key based on the location 110 and use the first key to encrypt data to transmit to the entity 121 while the entity 121 may generate a second key based on the location 120 and use the second key to encrypt data to transmit to the entity 111. However, because the entity 111 and the entity 121 are at different locations, the first key and the second key may also be different. As such, the entity 111 may not be able to decrypt data that has been encrypted by a key generated based on the location 120 while the entity 121 may not be able to decrypt data has been encrypted by a key that has been generated based on the location 110. Alternatively, the entity 121 may generate a key in response to the entity 111 initiating a transmission of data and may decrypt the generated key based on the location of the entity 121 (e.g., location 120). The entity 121 may then transmit the encrypted key to the entity 111. After receiving the encrypted key, the entity 111 may attempt to decrypt the encrypted key based on its location 110. However, since the location 110 is not the same as the location 120, the entity 110 may not be able to decrypt the key.

As such, each entity may generate a key based on its identified location. The key may be used to encrypt data transmitted between the entities. In some embodiments, the generated key may be a symmetric key that is used to both decrypt and encrypt data. Alternatively, the generated key may be a public key for encrypting data and a corresponding private key for decrypting the data may also be generated. Each entity may be able to decrypt encrypted data from another entity if the entities are in the same location and have generated the same location information.

Figure 2:
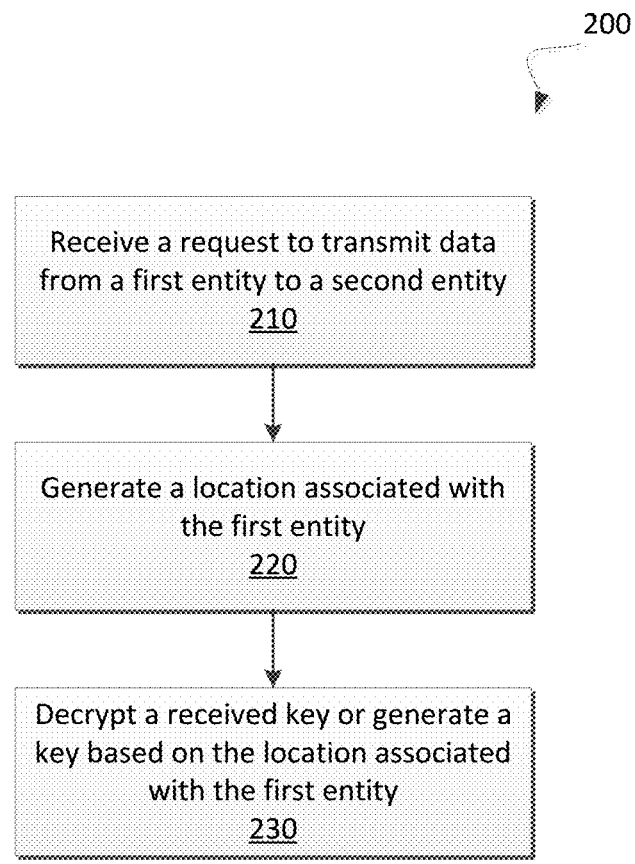
FIG. 2 is a flow diagram of an example method to perform location aware cryptography in accordance with some embodiments.

FIG. 2 is a flow diagram of an example method 200 to perform location aware cryptography. In general, the method 200 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 200 may be performed by the location aware cryptography module 130 of FIG. 1.

As shown in FIG. 2, the method 200 may begin with the processing logic receiving a request to transmit data from a first entity to a second entity (block 210). For example, the first entity may initiate a request to establish a communications session to transmit data between the first entity and the second entity. The processing logic may further generate a location associated with the first entity (block 220). For example, the first entity may determine location information associated with the first entity. In some embodiments, the location information may be associated with a latitude value, longitude value, altitude value, time, or any other such value as is further described in conjunction with FIG. 5. The processing logic may further decrypt a received key or generate a key based on the location associated with the first entity (block 230). For example, the first entity may receive an encrypted key from the second entity and the first entity may attempt to decrypt the encrypted key based on the location associated with the first entity. If the first entity is associated with the same location as the second entity, then the first entity may be able to successfully decrypt the encrypted key. However, if the first entity is not associated with the same location as the second entity, then the first entity may not be able to successfully decrypt the encrypted key. Alternatively, the first entity may generate or derive a key based on the location associated with the first entity. The generated key may then be used to decrypt and encrypt data transmitted between the first entity and the second entity. If the first entity and the second entity are associated with the same location, then each of the first entity and second entity has generated the same key and may similarly be able to decrypt data that has been encrypted by the same key.

Figure 3:
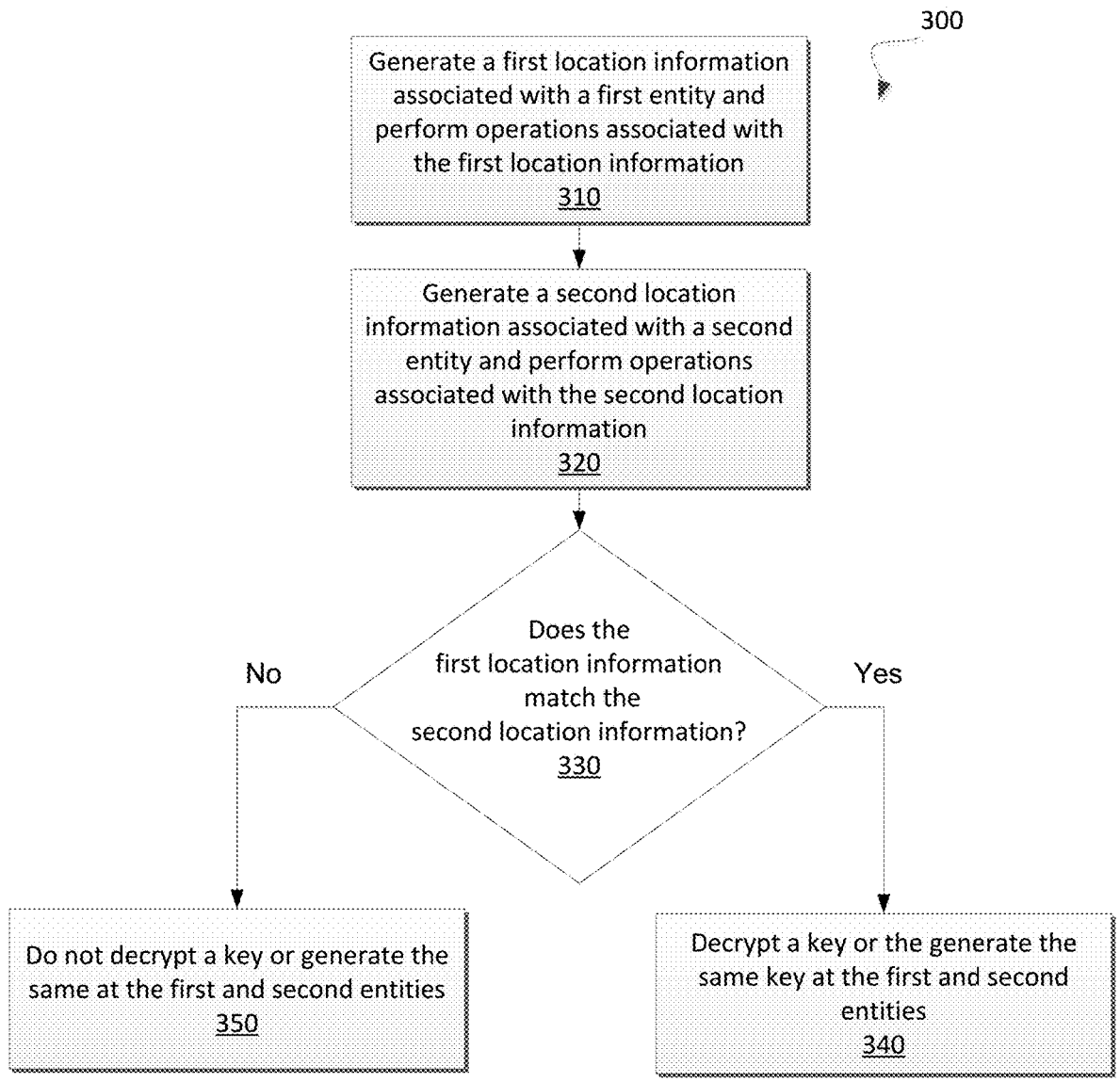
FIG. 3 is a flow diagram of an example method of two entities transmitting data based on location aware cryptography in accordance with some embodiments of the present disclosure.

FIG. 3 is a flow diagram of an example method 300 of two entities transmitting data based on location aware cryptography. In general, the method 300 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 300 may be performed by the location aware cryptography module 130 of FIG. 1. For example, the method 300 may be performed by a location aware cryptography module 130 that is located on each of a first entity and a second entity.

As shown in FIG. 3, the method 300 may begin with the processing logic generating a first location information associated with a first entity and may perform operations associated with the first location information (block 310). For example, the first entity may identify its location (e.g., the first location) and may generate first location information based on the identified first location. The first location information may be a value that is determined based on longitude, latitude, altitude, and time when the first location is identified. The operations that are performed may be associated with cryptographic operations and/or operations used to generate a key or to decrypt a key. The processing logic may further generate a second location information associated with a second entity and may perform operations associated with the second location information (block 320). For example, the second entity may also identify its location (e.g., the second location) and may generate location information based on the identified second location. Furthermore, the operations that are performed may also be associated with cryptographic operations and/or operations used to generate a key or to decrypt a key. The processing logic may further determine if the first location information matches the second location information (block 330). For example, the processing logic may determine if the first location information identified and/or generated by the first entity is the same as the second location information identified and/or generated by the second entity. If the first location information does not match the second location information, then a key may not be decrypted or the same key may not be generated at each of the first and second entities (block 350). For example, an encrypted key that is transmitted from the second entity to the first entity may not be successfully decrypted by the first entity if the first location information associated with the first entity does not match the second location information associated with the second entity. Alternatively, the first entity may generate a first key and the second entity may generate a second key that is different than the first key if the first location information associated with the first entity does not match the second location information associated with the second entity. Alternatively, if the first location information does match the second location information, then a key may be decrypted or the same key may be generated by each of the first and second entities (block 340). For example, an encrypted key that is transmitted from the second entity to the first entity may be successfully decrypted by the first entity if the first location information associated with the first entity is the same as the second location information associated with the second entity. Alternatively, the first entity may each generate the same key when the first location information associated with the first entity is the same as the second location information associated with the second entity.

As such, the same key may be separately generated at each of the first entity and the second entity when the first entity and the second entity are associated with the same location information. In the same or alternative embodiments, a key may be successfully decrypted when the first entity and the second entity are associated with the same location information.

Figure 4:
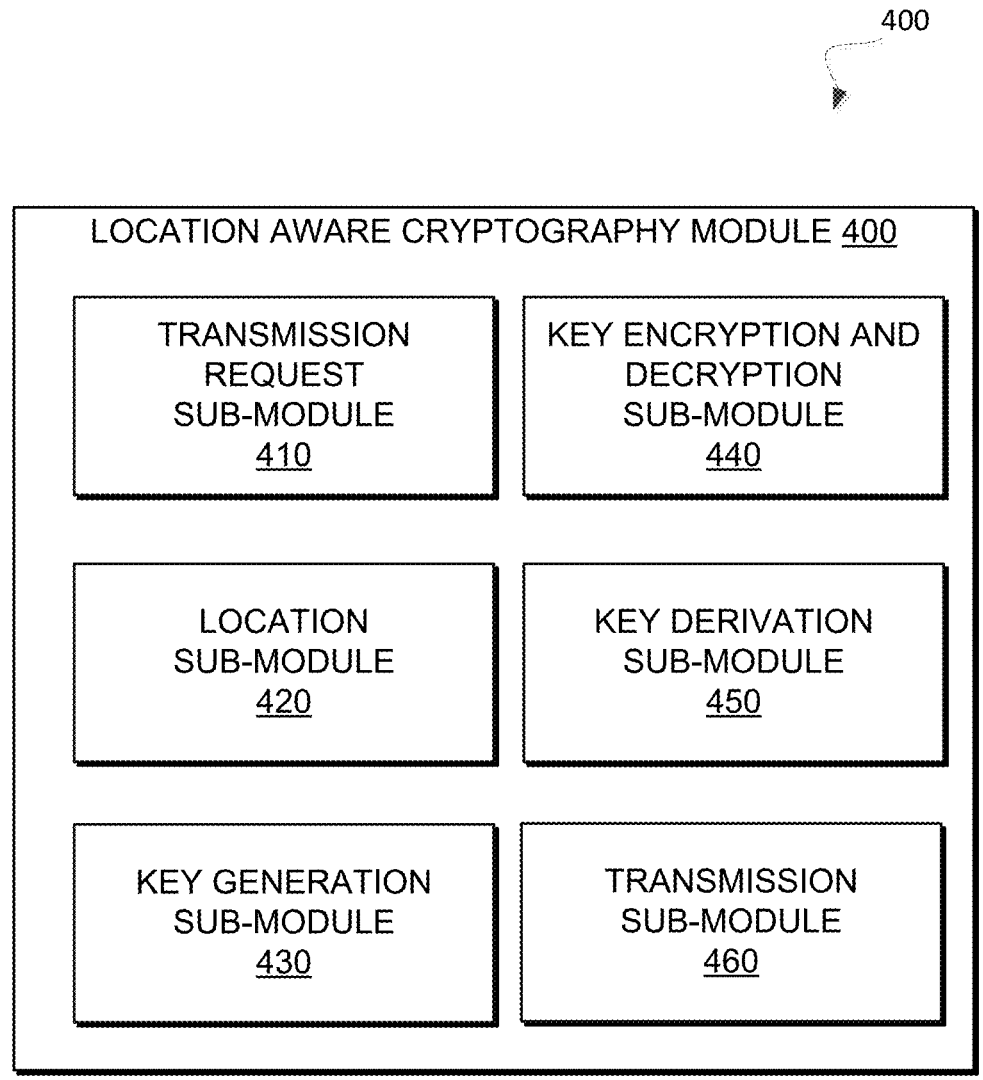
FIG. 4 is a block diagram of a location aware cryptography module to provide location aware cryptography for an entity in accordance with some embodiments.

FIG. 4 illustrates a block diagram of a location aware cryptography module 400 to provide location aware cryptography. The location aware cryptography module 400 may include a transmission request sub-module 410, a location sub-module 420, a key generation sub-module 430, a key encryption and decryption sub-module 440, a key derivation sub-module 450, and a transmission sub-module 460. In alternative embodiments, the functionality of one or more of the modules may be combined or divided. Furthermore, the location aware cryptography module 400 may correspond to the location aware cryptography module 130 of FIG. 1.

As shown in FIG. 4, the location aware cryptography module 400 may include a transmission request sub-module 410 to initiate a request to establish a communications session between a first entity (e.g., an entity including the location aware cryptography module 400) and a second entity (e.g., another entity including another location aware cryptography module 400) where the communications session may be used to transit encrypted data between the first entity and the second entity. The location sub-module 420 may identify a location of an entity that includes the location aware cryptography module 400 and to generate location information. The key generation sub-module 430 may generate a key and the key encryption and decryption sub-module 440 may encrypt the generated key and/or decrypt an encrypted key. For example, the key generation sub-module 430 may generate a key and the key encryption and decryption sub-module 440 may decrypt the key based on the location information identified by the location sub-module 420. Furthermore, in some embodiments, if the encrypted key is received from another entity, then the key encryption and decryption sub-module 440 may attempt to decrypt the key based on the location identified by the location sub-module 420. Further details with regard to generating a key, encrypting the key, and decrypting the key based on identified location information are described in conjunction with FIGS. 6A-6C.

Referring to FIG. 4, the key derivation sub-module 450 may generate or derive a key based on the location information identified by the location sub-module 420. For example, the key may be generated or derived by various values as is further described in conjunction with FIGS. 7A-8B. The transmission sub-module 460 may transmit encrypted data. For example, a key that has been decrypted (e.g., by the key encryption and decryption sub-module 440) or a key that has been generated or derived (e.g., by the key derivation sub-module 450) may be used to encrypt data to be transmitted from a first entity to a second entity.

Figure 5:
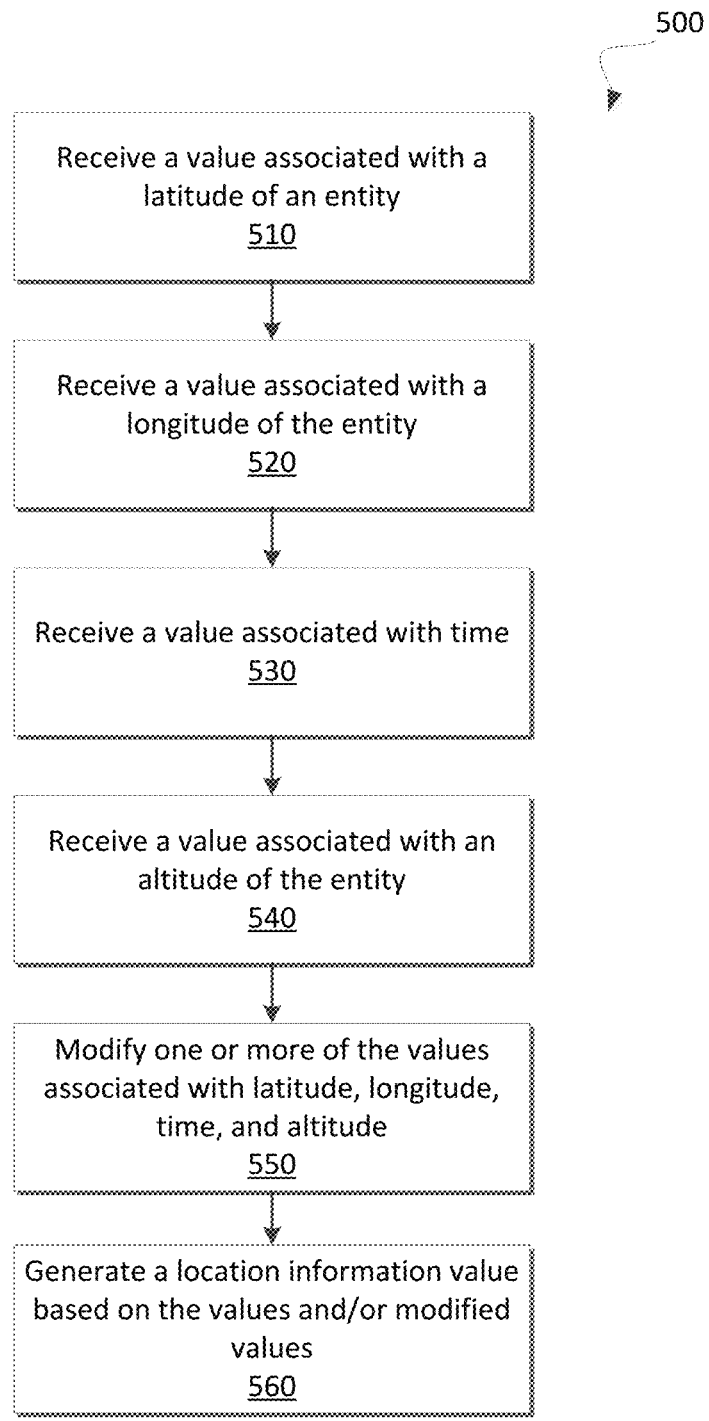
FIG. 5 is a flow diagram of an example method to generate location information of an entity for location aware cryptography in accordance with some embodiments.

FIG. 5 is a flow diagram of an example method 500 to generate location information of an entity for location aware cryptography. In general, the method 500 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 500 may be performed by the location aware cryptography module 130 or 400 of FIGS. 1 and 4.

As shown in FIG. 5, the method 500 may begin with the processing logic receiving a value associated with a latitude of an entity (block 510). Furthermore, the processing logic may receive a value associated with the longitude of the same entity (block 520). The processing logic may additionally receive a value associated with time (block 530). In some embodiments, the received time may correspond to a time when the entity has requested to initiate a transmission of data to another entity. The processing logic may further receive a value associated with an altitude of the entity (block 540). In some embodiments, the values associated with the latitude, longitude, and altitude of the entity may correspond to the latitude, longitude, and altitude of the entity at the time when the entity has requested to initiate the transmission of data to the other entity. Thus, a time and a geographical location (e.g., latitude, longitude, and/or altitude) may be received when the entity requests to initiate a transmission of data to another entity. The processing logic may further modify one or more of the values associated with the latitude, longitude, time, and altitude (block 550). For example, each of the received values may correspond to a number of bits and one or more of the least significant bits of a value may be replaced with values of zero. The processing logic may further generate a location information value based on the received values and/or the modified values (block 560). For example, a single number may be derived from one or more of the values associated with the latitude, longitude, altitude, and time associated with an entity. In some embodiments, the location data value may be generated based on a hash function or algorithm that maps data of an arbitrary size to data of a fixed size so that differences in input data may produce different output hash values or numbers. For example, the hash function may generate the hash number based on the values of the latitude, longitude, altitude, and/or time associated with the entity. In some embodiments, the hash function or algorithm may be a cryptographic hash algorithm such as Secure Hash Algorithm-2 (SHA-2). As such, multiple values corresponding to a geographical location and a time of an entity may be received when the entity has requested to initiate a transmission of data to another entity and a single location data value may be generated based on the multiple values corresponding to the geographical location and the time of the entity.

Figure 6A:
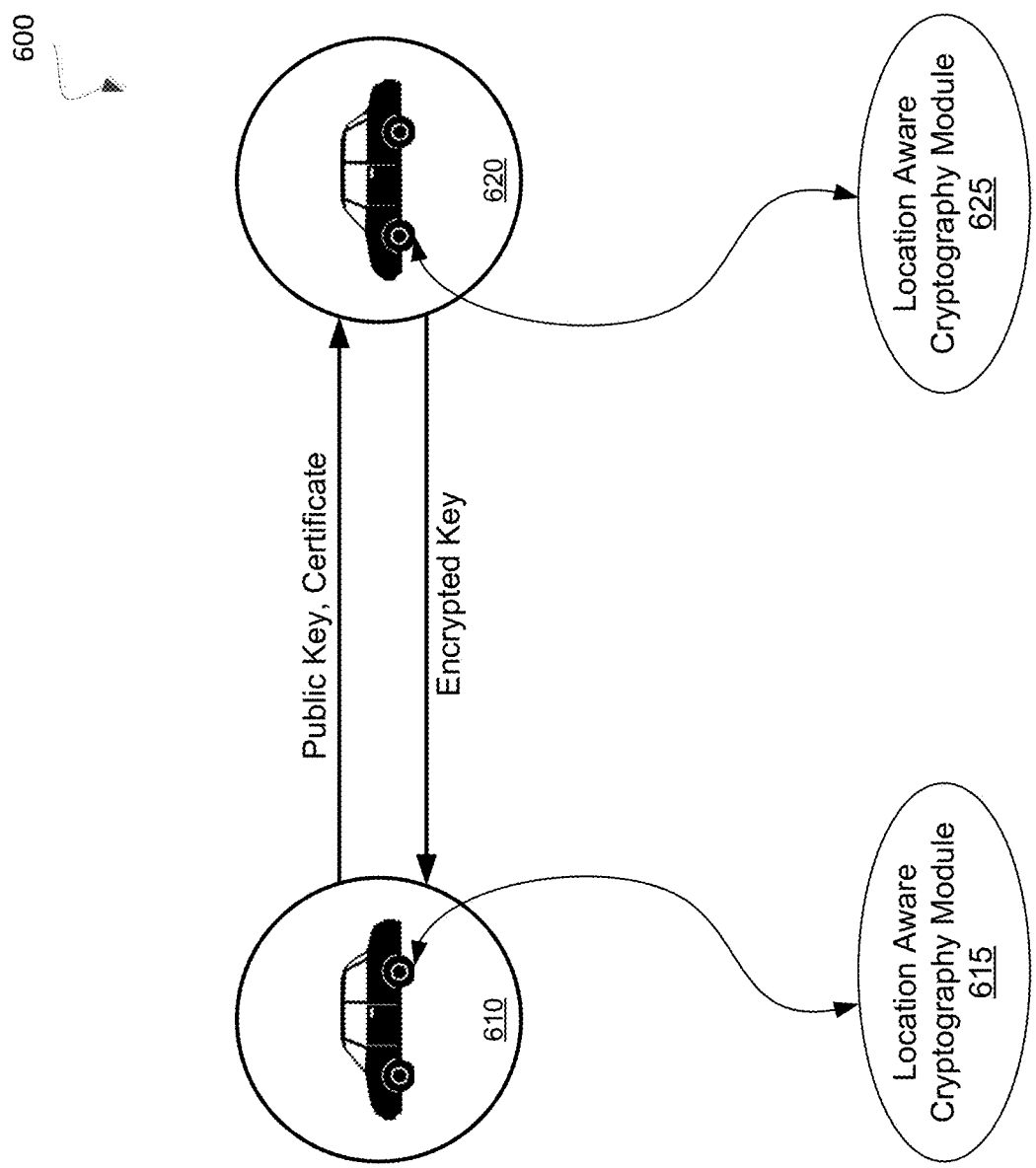
FIG. 6A illustrates an example environment including two entities using location aware cryptography with a key exchange technique in which some embodiments of the disclosure may operate.

FIG. 6A illustrates an example environment 600 including two entities using location aware cryptography with a key exchange technique. In general, the environment 600 may include a first entity 610 and a second entity 620 where each of the entities 610 and 620 include a location aware cryptography module to provide location aware cryptography.

As shown in FIG. 6A, the environment 600 may include a first entity 610 and a second entity 620. For example, the first entity 610 may be a first vehicle and the second entity 620 may be a second vehicle where the first vehicle corresponding to the first entity 610 may seek to initiate a transmission of data (e.g., speed and/or position data of the first vehicle) to the second vehicle corresponding to the second entity 620. As shown, the first entity 610 may include a first location aware cryptography module 615 and the second entity 620 may include a second location aware cryptography module 625. The first entity 610 may transmit a public key and a certificate to the second entity when the first entity seeks to establish a communications session to transmit data to the second entity. In some embodiments, the public key may be mathematically linked or associated with a private key. For example, the public key may be used to encrypt data or plaintext to generate encrypted data or ciphertext while the corresponding private key may be used to decrypt the encrypted data or ciphertext to retrieve the data or the plaintext. As such, the private key may be considered an inverse of the public key. A certificate may refer to an electronic document or data that may be used to prove ownership of the public key (e.g., to prove to the second entity 620 that the public key transmitted by the first entity 610 is associated with the first entity 610). The certificate may include information about the public key, the identity of the owner of the public key, and a digital signature of an entity (e.g., a third party entity or root authority) that has verified the contents of the certificate. If the signature of the certificate is valid, then the second entity 620 may be determine that the public key transmitted by the first entity 610 is properly associated or assigned to the first entity 610.

In some embodiments, the first entity 610 may be associated with the public key, a private key that corresponds to the public key, and a certificate. The public key and the certificate may be transmitted from the first entity 610 to the second entity 620 when the first entity 610 seeks to initiate a transmission of data to the second entity 620. The location aware cryptography module 615 may generate a first location information or data associated with the first entity 610 and the location aware cryptography module 625 may generate a second location information associated with the second entity 620. The first entity 610 may generate a location based private key that is based on a combination of the first location information associated with the first entity 610 and the private key of the first entity 610. The second entity 620 may verify the received public key based on the certificate and, if verified, may generate a location based public key that is based on a combination of the second location information associated with the second entity 620 and the public key received from the first entity 610. The second entity may then generate a session key to be used to encrypt and/or decrypt data transmitted between the first entity 610 and the second entity 620. The second entity 620 may then encrypt the session key based on the location based public key and may transmit the encrypted session key to the first entity 610. In response, the first entity 610 may decrypt the encrypted session key by using the location based private key. As previously described, the public key may be mathematically linked to the private key. Thus, when the second entity 620 generates the location based public key and encrypts the session key based on the location based public key, the first entity 610 may only decrypt the encrypted session key when its location information is identical to the location information associated with the second entity 620. Subsequently, the session key may be used to encrypt data and/or to decrypt data transmitted between the first entity 610 and the second entity 620.

Figure 6B:
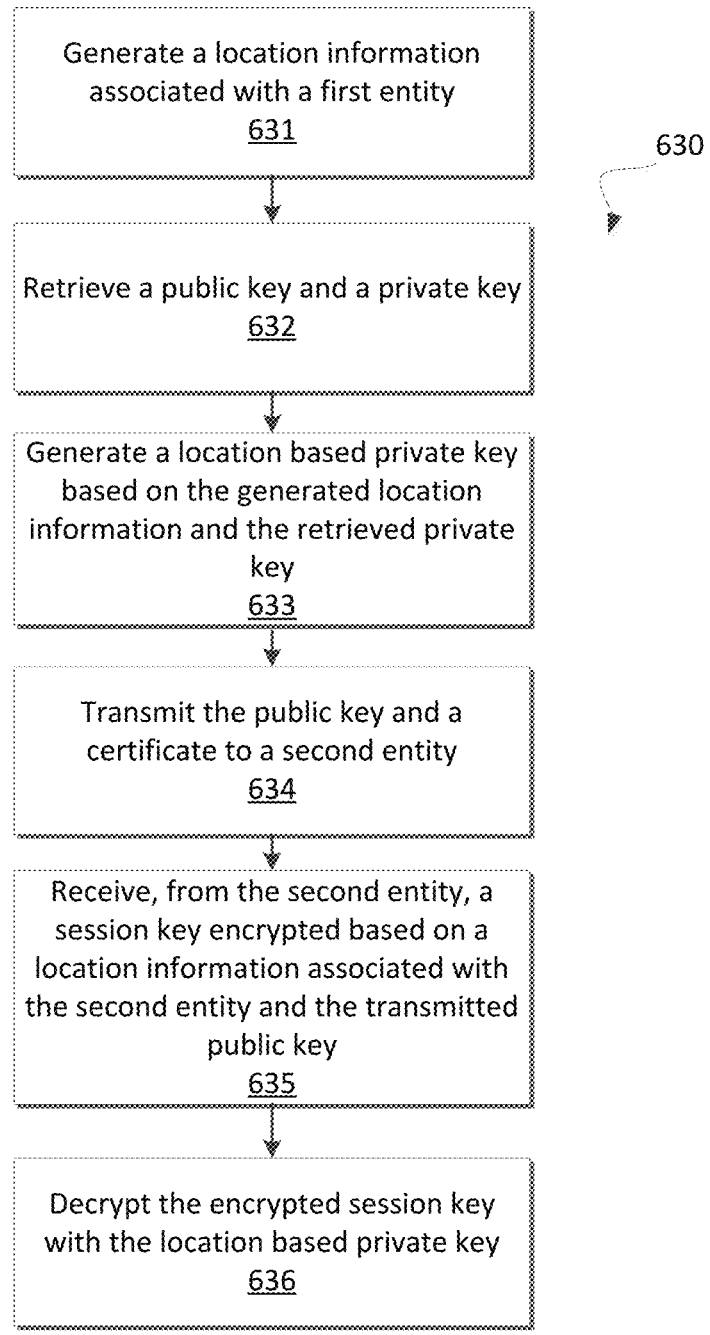
FIG. 6B illustrates an example flow diagram of a method corresponding to a first entity using location aware cryptography to transmit and receive data from a second entity in which some embodiments of the disclosure may operate.

FIG. 6B illustrates an example flow diagram of a method 630 corresponding to a first entity using location aware cryptography to transmit data with a second entity. In general, the method 630 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 630 may be performed by the location aware cryptography module 130 or 400 of FIGS. 1 and 4 or by the location aware cryptography module 615 of a first entity 610 initiating a request to transmit data to a second entity 620 of FIG. 6A.

As shown in FIG. 6B, the method 630 may begin with the processing logic generating a location information associated with a first entity (block 631). For example, the location information may be generated in response to the first entity requesting to initiate a transmission of data to a second entity. The processing logic may retrieve a public key and a private key (block 632). For example, the public key and the private key may be retrieved from a memory associated with the first entity. Furthermore, the public key may be used to encrypt data and the private key may be used to decrypt data that has been encrypted with the public key. The processing logic may generate a location based private key that is based on a combination of the generated location information and the retrieved private key (block 633). Furthermore, the processing logic may transmit the public key and a certificate to the second entity (block 634). The certificate may include information that may be used by the second entity to verify that the public key is associated with the first entity. The processing logic may further receive a session key that has been encrypted based on a location associated with the second entity and the transmitted public key (block 635). For example, the received session key may be encrypted based on a combination of the public key that was transmitted by the first entity and second location information that was generated by the second entity. The processing logic may further attempt to decrypt the session key with the location based private key (block 636). For example, if a location information generated by the second entity matches the location information of the first entity, then the encrypted session key may be successfully decrypted with the location based private key. The session key may then be retrieved and data transmitted from the first entity to the second entity may be encrypted with the session key and may subsequently be decrypted by the second entity with the same session key. Furthermore, the session key may be used by the second entity to encrypt data transmitted to the first entity and the first entity may thus use the same session key to decrypt the data transmitted from the second entity.

Figure 6C:
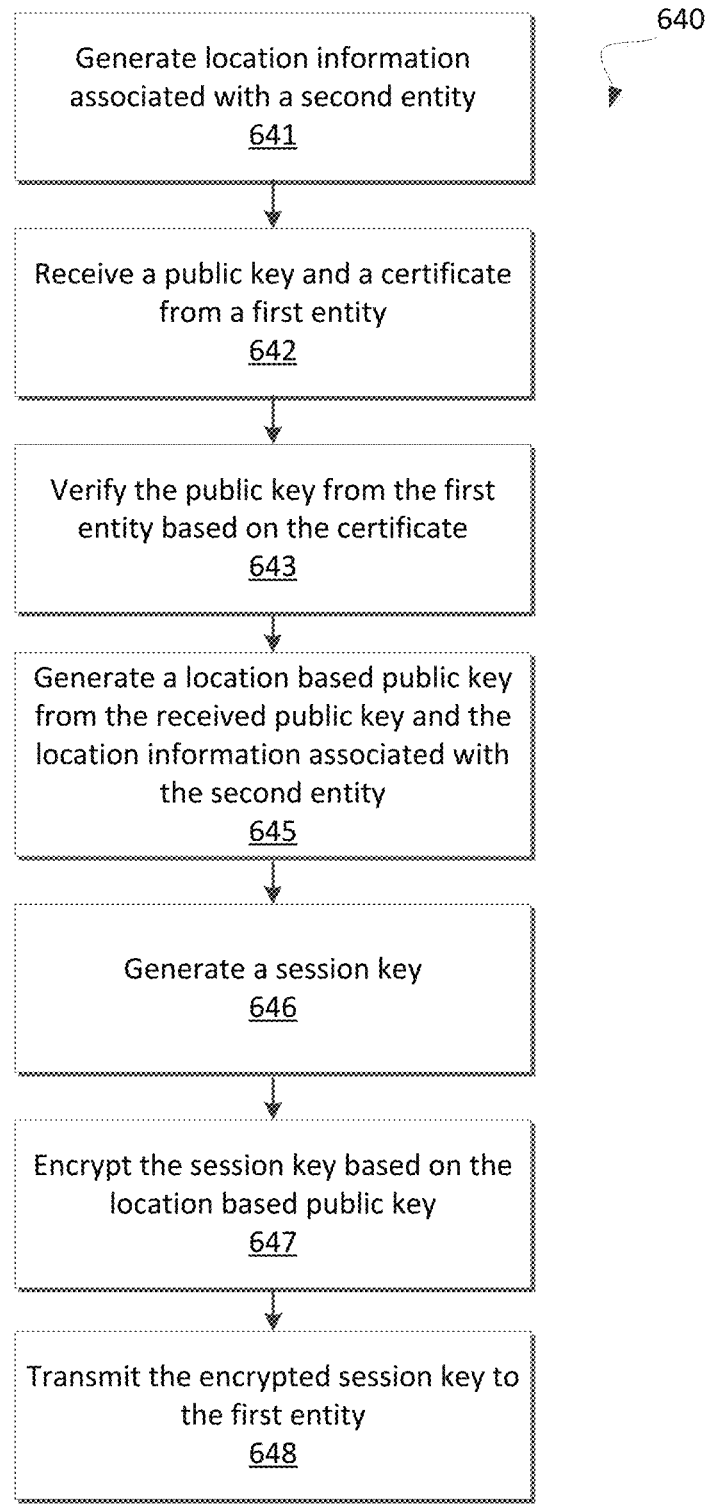
FIG. 6C illustrates an example flow diagram of the second entity of the example environment using location aware cryptography to transmit and receive data with the first entity in which some embodiments of the disclosure may operate.

FIG. 6C illustrates an example flow diagram of a method 640 corresponding to a second entity using location aware cryptography to transmit data with a first entity. In general, the method 640 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 640 may be performed by the location aware cryptography module 130 or 400 of FIGS. 1 and 4 or by the location aware cryptography module 625 of a second entity 620 in response to a request to transmit data by the first entity 610 of FIG. 6A.

As shown in FIG. 6C, the method 640 may begin with the processing logic generating location information associated with a second entity (block 641). For example, the location information may be generated in response to a request from a first entity to initiate a transmission of data to the second entity. The processing logic may further receive a public key and a certificate from the first entity (block 642). The processing logic may verify the public key from the first entity based on the certificate (block 643). Furthermore, the processing logic may generate a location based public key from the public key received from the first entity and the location information associated with the second entity (block 645). For example, the location based public key may be generated based on a combination of the public key received from the first entity and the location information generated by the second entity. The processing logic may generate a session key (block 646). Subsequently, the session key may be encrypted based on the location based public key (block 637). Furthermore, the encrypted session key may be transmitted to the first entity (block 638). In some embodiments, the session key may then be used to decrypt encrypted data transmitted from the first entity to the second entity.

FIG. 7A illustrates an example environment 700 including two entities using location aware cryptography with a key derivation technique. In general, the environment 700 may include a first entity 610 and a second entity 620 where each of the first and second entities 610 and 620 include a location aware cryptography module to provide location aware cryptography.

As shown in FIG. 7A, the environment 700 may include a first entity 610 with a first location aware cryptography module 615 and a second entity 620 with a second location aware cryptography module 625. Each of the first entity 610 and the second entity 620 may generate or derive a key. In some embodiments, the key generated by the first entity 610 and the key generated by the second entity 620 may be identical when the first entity 610 and the second entity 620 are associated with the same location information. Alternatively, the key generated by the first entity 610 and the key generated by the second entity 620 may be different when the first entity 610 and the second entity 620 are not associated with the same location information.

The first entity 610 may transmit data 710 to the second entity 620 and the second entity 620 may transmit data 720 to the first entity 610. Furthermore, the first entity 610 may then generate a key based on location information determined or generated by the first entity 610, additional data associated with the first entity 610, and the data 720 received from the second entity 620. Additionally, the second entity 620 may generate a corresponding key based on location information determined or generated by the second entity 620, additional data of the second entity 620, and the data 710 that is received from the first entity 610.

In some embodiments, the data 710 and the data 720 may each be based on a random number and a value corresponding to a point on an elliptic curve. For example the entity 610 and the entity 620 may use elliptic curve cryptography (ECC) to generate corresponding keys. ECC may refer to public-key cryptography that is based on algebraic structure of elliptic curves over finite fields. The entity 610 may generate a first random number and the entity 620 may generate a second random number. The entity 610 may perform elliptic curve point multiplication based on the first random number and a point on an elliptic curve to generate a first elliptic curve point multiplication value (e.g., the data 710) and the entity 620 may also perform elliptic curve point multiplication based on the second random number and the same point on the elliptic curve to generate a second elliptic curve point multiplication value (e.g., the data 720). The elliptic curve point multiplication may be an operation of successively adding a point along an elliptic curve to itself repeatedly (e.g., based on the first or second random numbers). The first entity 610 may then generate or derive a first key based on first information determined by the first entity 610, the first random number, and the second elliptic curve point multiplication value that is received from the second entity 620 from the data 720. Furthermore, the second entity 620 may then generate or derive a second key based on second location information determined by the second entity 620, the second random number, and the first elliptic curve point multiplication value received from the first entity 610 from the data 710. If the first location information is identical to the second location information, then the first key and the second key may then be identical and each of the first entity 610 and the second entity 620 may encrypt data to be transmitted to the other entity and decrypt data received from the other entity.

Figure 7B:
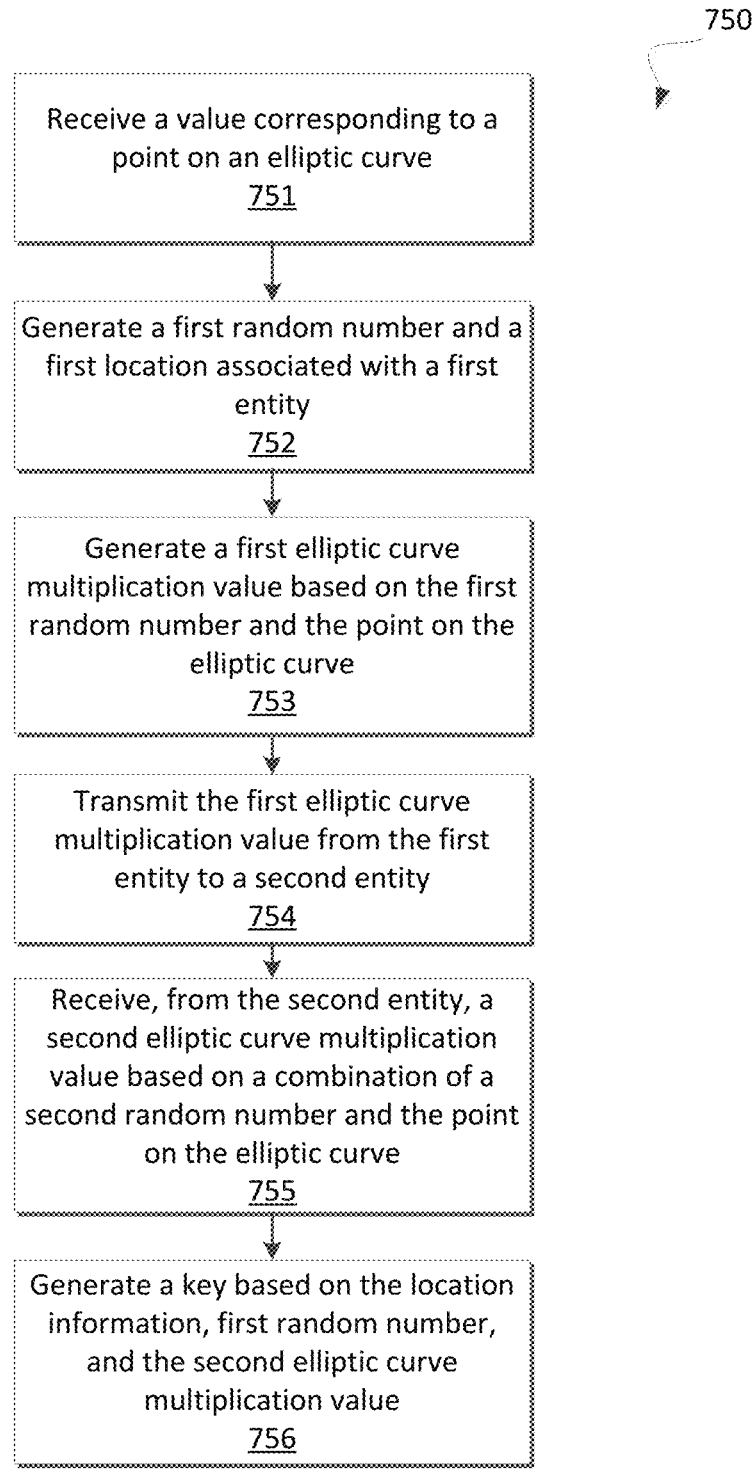
FIG. 7B illustrates an example flow diagram of operations of a first entity using location aware cryptography with the key derivation technique to transmit and receive data with a second entity in which some embodiments of the disclosure may operate.

FIG. 7B illustrates an example flow diagram of a method 750 corresponding to a first entity using location aware cryptography with a key derivation technique to transmit data with a second entity. In general, the method 750 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 750 may be performed by the location aware cryptography module 130 or 400 of FIGS. 1 and 4 or by the location aware cryptography module 615 of a first entity 610 initiating a request to transmit data to a second entity 620 of FIG. 7A. The method 750 may be referred to as a Diffie-Hellman key exchange used to exchange a cryptographic key between entities. The Diffie-Hellman key exchange method 750 allows two entities (e.g., the first and second entities 610 and 620) that have no prior knowledge of each other to jointly establish a shared secret key (e.g., the session key) that may be used encrypt and decrypt subsequent communications or data with a symmetric key.

As shown in FIG. 7B, the method 750 may begin with the processing logic receiving a value corresponding to a point on an elliptic curve (block 751). The processing logic may further generate a first random number and a first location information associated with a first entity (block 752). The processing logic may generate first elliptic curve multiplication value based on a combination of the first value and the first random number (block 753). For example, an elliptic curve multiplication operation may be performed on the first random number and the point on the elliptic curve. The processing logic may further transmit the first elliptic curve multiplication value from the first entity to a second entity (block 754). Additionally, the processing logic may receive, from the second entity, a second elliptic curve multiplication value that is based on a combination of the value corresponding to the point on the elliptic curve and a second random number (block 755). For example, the second entity may generate a second random number independently from the first entity and may perform an elliptic curve multiplication operation based on the second random number and the point on the elliptic curve. Furthermore, the processing logic may generate a first key based on the first location information, the first random number, and the second elliptic curve multiplication value that is received from the second entity (block 756). Furthermore, the second entity may also generate a second key based on the second location information determined by the second entity, the second random number determined by the second entity, and the first elliptic curve multiplication value received from the first entity. If the first location information is the same as the second location information, then the first key and the second key may be identical.

As such, the first entity may determine a first location of the first entity and the second entity may determine a second location of the second entity. Each of the first entity and the second entity may exchange information or data (e.g., the first and second elliptic curve multiplication values) and each of the first and second entities may generate a key based on the corresponding entity's location, received elliptic curve multiplication value, and the random number generated by the respective entity.

Figure 8A:
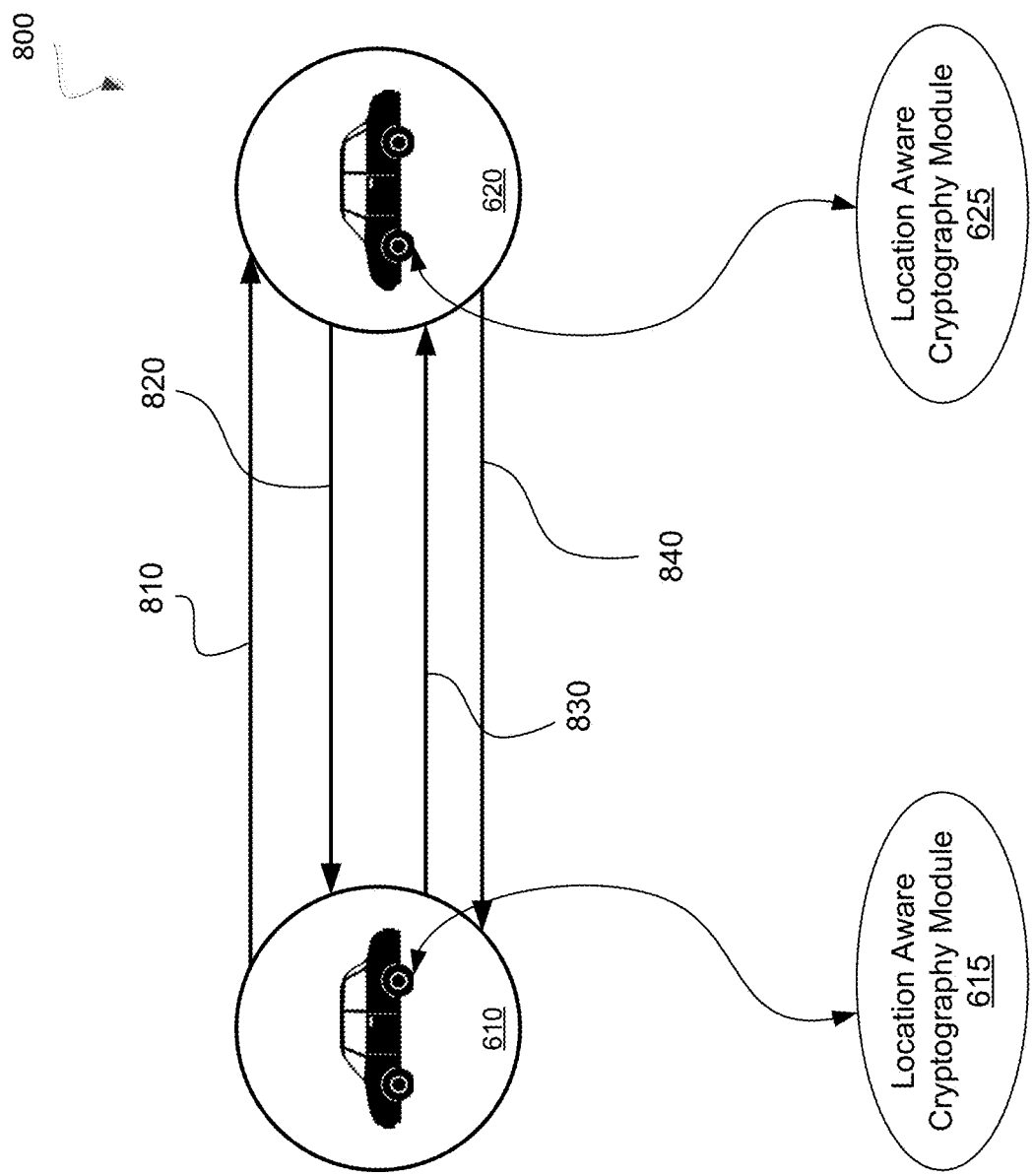
FIG. 8A illustrates an example environment including two entities using location aware cryptography with an authenticated key derivation technique in which some embodiments of the disclosure may operate.

FIG. 8A illustrates an example environment 800 including two entities using location aware cryptography with an authenticated key derivation technique. In general, the environment 800 may include a first entity 610 with a location aware cryptography module 615 and a second entity 620 with a location aware cryptography module 625.

As shown in FIG. 8A, the environment 800 may include the first entity 610 and the second entity 620 exchanging data 810, 820, 830, and 840. The first entity 610 may generate a first key and the second entity 620 may generate a second key. The first entity 610 may transmit data 810 to the second entity 620. The data 810 may include a first public key and a first certificate. The second entity 620 may transmit data 820 to the second entity. The data 820 may include a second public key and a second certificate. Each of the first and second entities may verify the received public key based on the received certificate. After verifying the second public key based on the second certificate, the first entity 610 may transmit data 830 to the second entity 620. The data 830 may be a value based on a combination of a first location of the first entity 610, a first random number, and the second public key that was received from the second entity 620. Furthermore, the second entity 620 may transmit data 840 to the first entity 610. The data 840 may be a value based on a combination of a second location of the second entity 620, a second random number, and the first public key that was received from the first entity 610. The first entity 610 may then generate a first key based on its location information and information received from the second entity 620 and the second entity 620 may generate a second key based on its location information and information received from the first entity 610.

Figure 8B:
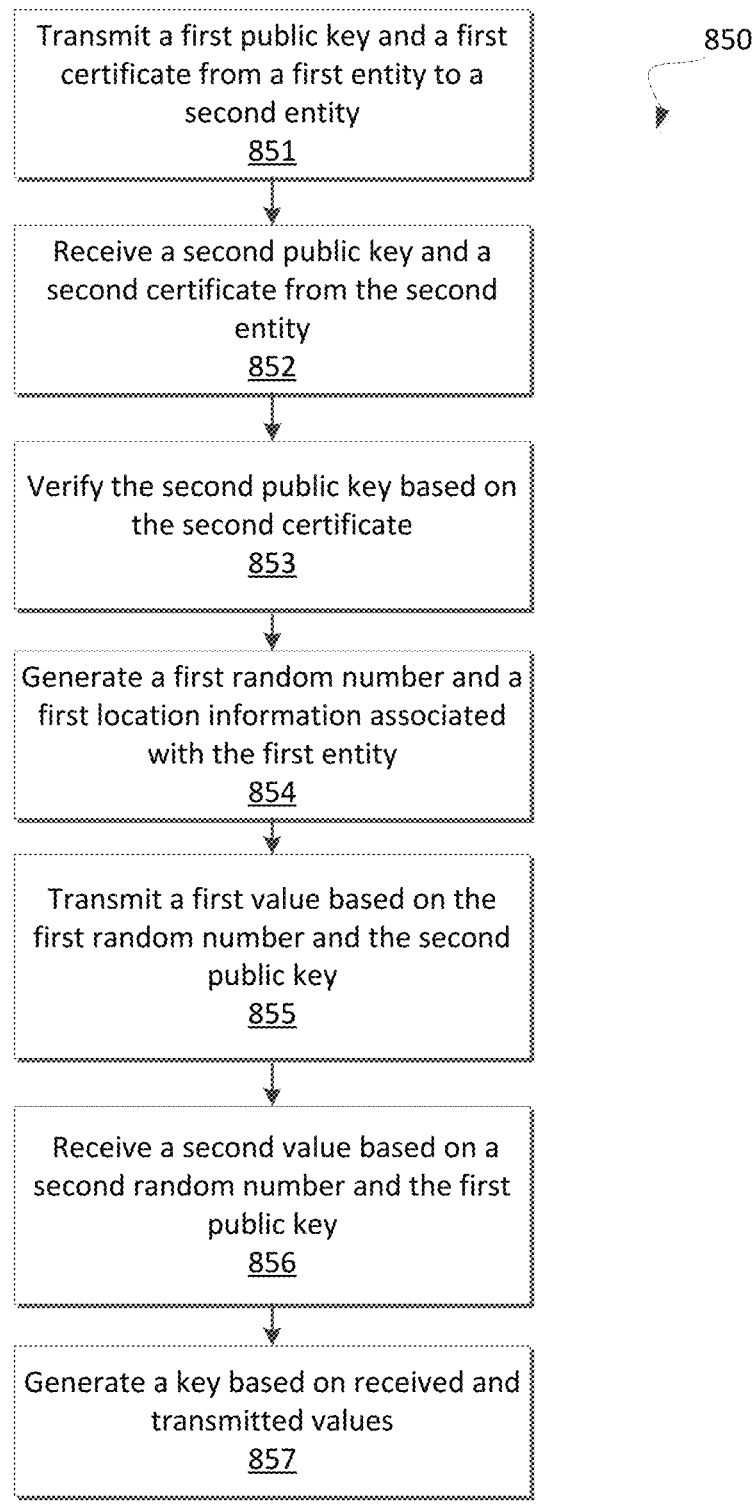
FIG. 8B illustrates an example flow diagram of operations of a first entity using location aware cryptography with the authenticated key derivation technique to transmit and receive data with a second entity in which some embodiments of the disclosure may operate.

FIG. 8B illustrates an example flow diagram of a method 850 corresponding to a first entity using location aware cryptography with an authenticated key derivation technique to transmit data with a second entity. In general, the method 850 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 850 may be performed by the location aware cryptography module 130 or 400 of FIGS. 1 and 4 or the location aware cryptography 615 of a first entity 610 initiating a request to transmit data to a second entity 620 of FIG. 8A. The method 850 may be referred to as an authenticated Diffie-Hellman key exchange used to exchange information between entities and to generate or derive cryptographic keys.

As shown in FIG. 8B, the method 850 may begin with the processing logic transmitting a first public key and a first certificate from a first entity to a second entity (block 851). Furthermore, the processing logic may receive a second public key and a second certificate from the second entity. In some embodiments, the first public key and the second public key may correspond to a point on an elliptic curve. The processing logic may further verify the second public key based on the second certificate (block 853). In response to verifying the second public key that is received from the second entity, the processing logic may generate a first random number and a first location information of the first entity (block 854). For example, the first entity may generate the first location information based on a current location of the first entity. The processing logic may transmit a first value based on the first random number generated by the first entity and the second public key that is received from the second entity (block 855). Furthermore, the processing logic may receive a second value that is based on a second random number and the first public key (block 856). For example, the second entity may generate a second random number and generate the second value based on a combination of the random number generated by the second entity and the first public key that was received from the first entity. The processing logic may subsequently generate a key based on the received and transmitted values (block 857). For example, the key may be generated by the first entity based on a combination of the second value received from the second entity, the first location information determined by the first entity, and additional information associated with the first entity. In some embodiments, the key may be generated based on a combination of the first location information, first random number, second random number, and first and second public keys.

Figure 9:
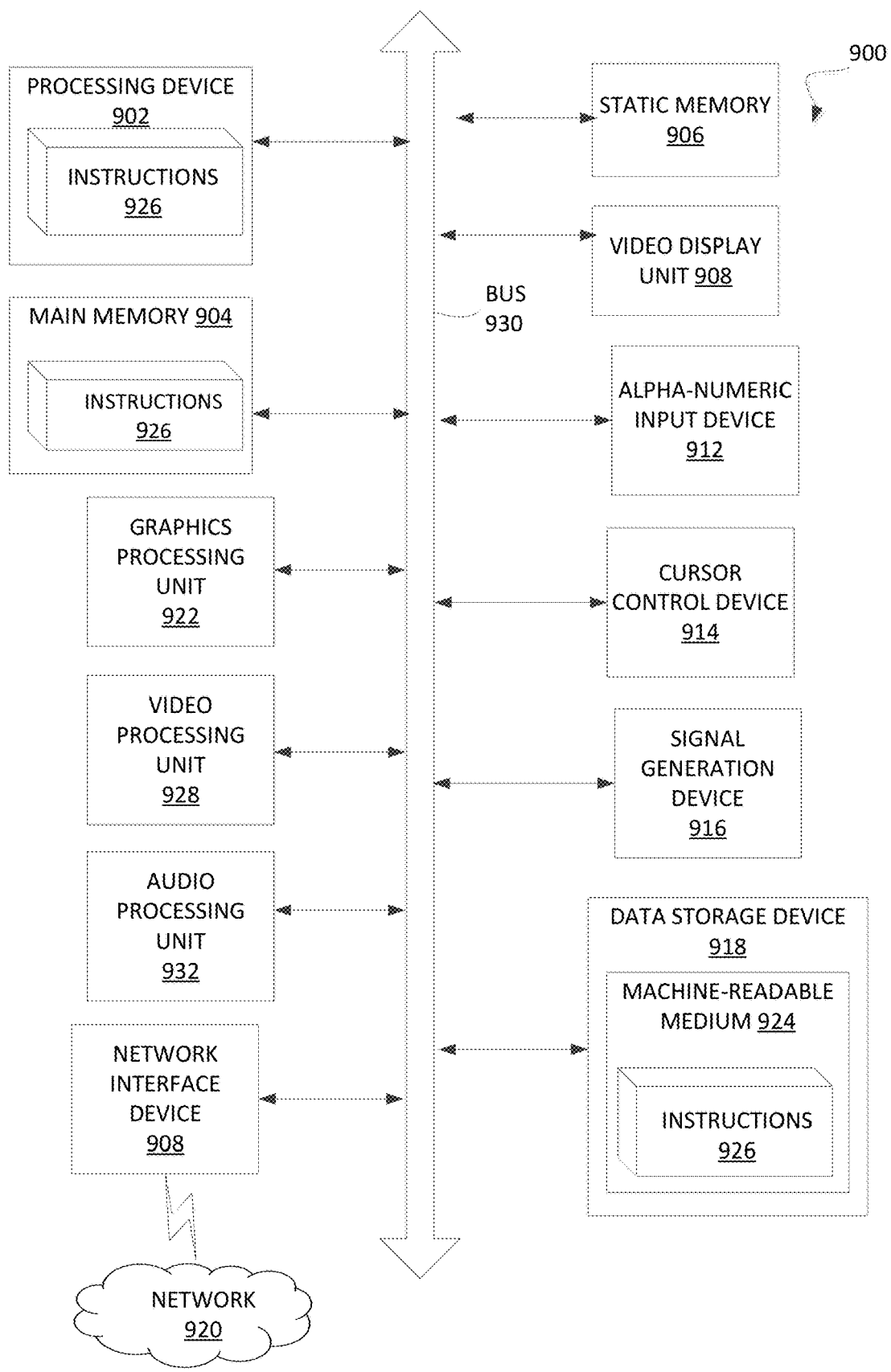
FIG. 9 illustrates a block diagram of an embodiment of a computer system in which some embodiments of the disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a computer-readable medium) on which is stored one or more sets of instructions or software 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In one implementation, the instructions 926 include instructions to implement functionality corresponding to a location aware cryptography module (e.g., location aware cryptography module 130 of FIG. 1 or location aware cryptography module 400 of FIG. 4). While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   transmitting a request to transmit data from a first device to a second device;
   receiving an encrypted session key from the second device in response to the request, wherein the encrypted session key is encrypted by a second device key that is based on a combination of a public key and a time value associated with the second device;
   identifying another time value associated with the first device; and
   generating, by a processing device, a first device key based on a combination of the time value associated with the first device and a private key that corresponds to the public key, wherein the first device key decrypts the encrypted session key responsive to the time value associated with the first device corresponding to the time value associated with the second device.

2. The method of claim 1, wherein the second device key is further based on a location of the second device, and wherein the first device key is further based on another location of the first device.

3. The method of claim 1, further comprising:
   in response to decrypting the encrypted session key, encrypting data based on the session key; and
   transmitting the encrypted data from the first device to the second device.

4. The method of claim 1, wherein the another time value associated with the first device and the time value associated with the second device are based on a time to transmit the data from the first device to the second device.

5. The method of claim 1, further comprising:
   generating a hash value based on the another time value associated with the first device, wherein the generating of the first device key is further based on the hash value.

6. The method of claim 1, wherein the session key is a symmetric key to encrypt data and to decrypt data encrypted by the session key.

7. The method of claim 1, wherein the encrypted session key is received in response to a verification of the public key.

8. A system comprising:
   a memory; and
   a processing device, operatively coupled with the memory, to:
   transmit a request to transmit data from a first device to a second device;
   receive an encrypted session key from the second device in response to the request, wherein the encrypted session key is encrypted by a second device key that is based on a combination of a public key and a time value associated with the second device;
   identify another time value associated with the first device; and
   generate a first device key based on a combination of the time value associated with the first device and a private key that corresponds to the public key, wherein the first device key decrypts the encrypted session key responsive to the time value associated with the first device corresponding to the time value associated with the second device.

9. The system of claim 8, wherein the second device key is further based on a location of the second device, and wherein the first device key is further based on another location of the first device.

10. The system of claim 8, wherein the processing device is further to:
  in response to decrypting the encrypted session key, encrypt data based on the session key; and
  transmit the encrypted data from the first device to the second device.

11. The system of claim 8, wherein the another time value associated with the first device and the time value associated with the second device are based on a time to transmit the data from the first device to the second device.

12. The system of claim 8, wherein the processing device is further to:
  generate a hash value based on the another time value associated with the first device, wherein the first device key is generated further based on the hash value.

13. The system of claim 8, wherein the session key is a symmetric key to encrypt data and to decrypt data encrypted by the session key.

14. The system of claim 8, wherein the encrypted session key is received in response to a verification of the public key.

15. A non-transitory computer readable medium comprising instructions, which when executed by a processing device, cause the processing device to perform operations comprising:
  transmitting a request to transmit data from a first device to a second device;
  receiving an encrypted session key from the second device in response to the request, wherein the encrypted session key is encrypted by a second device key that is based on a combination of a public key and a time value associated with the second device;
  identifying another time value associated with the first device; and
  generating a first device key based on a combination of the time value associated with the first device and a private key that corresponds to the public key, wherein the first device key decrypts the encrypted session key responsive to the time value associated with the first device corresponding to the time value associated with the second device.

16. The non-transitory computer readable medium of claim 15, wherein the second device key is further based on a location of the second device, and wherein the first device key is further based on another location of the first device.

17. The non-transitory computer readable medium of claim 15, the operations comprising:
  in response to decrypting the encrypted session key, encrypting data based on the session key; and
  transmitting the encrypted data from the first device to the second device.

18. The non-transitory computer readable medium of claim 15, wherein the another time value associated with the first device and the time value associated with the second device are based on a time to transmit the data from the first device to the second device.

19. The non-transitory computer readable medium of claim 15, the operations further comprising:
  generating a hash value based on the another time value associated with the first device, wherein the first device key is generated further based on the hash value.

20. The non-transitory computer readable medium of claim 15, wherein the session key is a symmetric key to encrypt data and to decrypt data encrypted by the session key.

* * * * *